US007777756B2

(12) United States Patent
Kwak et al.

(10) Patent No.: US 7,777,756 B2
(45) Date of Patent: Aug. 17, 2010

(54) METHOD AND APPARATUS FOR CALIBRATING COLOR PROPERTY OF MONITOR

(75) Inventors: Young-shin Kwak, Suwon -si (KR); Du-sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 11/543,853

(22) Filed: Oct. 6, 2006

(65) Prior Publication Data

US 2007/0091114 A1 Apr. 26, 2007

(30) Foreign Application Priority Data

Oct. 21, 2005 (KR) .................... 10-2005-0099898

(51) Int. Cl.
 G09G 5/02 (2006.01)
(52) U.S. Cl. ..................... 345/589; 345/581
(58) Field of Classification Search .......... 345/589–605
See application file for complete search history.

(56) References Cited

U.S. PATENT DOCUMENTS

| 4,914,506 | A | * | 4/1990 | Kafer et al. | 348/182 |
|---|---|---|---|---|---|
| 5,561,459 | A | * | 10/1996 | Stokes et al. | 348/180 |
| 6,034,665 | A | * | 3/2000 | Kim | 345/593 |
| 6,328,567 | B1 | * | 12/2001 | Morris et al. | 433/215 |
| 6,480,202 | B1 | * | 11/2002 | Deguchi et al. | 345/600 |
| 6,522,313 | B1 |  | 2/2003 | Cottone |  |
| 6,677,958 | B2 | * | 1/2004 | Cottone et al. | 345/589 |
| 6,690,383 | B1 | * | 2/2004 | Braudaway et al. | 345/600 |
| 6,933,967 | B2 | * | 8/2005 | Doyle et al. | 348/189 |
| 7,011,413 | B2 | * | 3/2006 | Wada | 353/31 |
| 7,015,980 | B2 | * | 3/2006 | Jang et al. | 348/655 |
| 7,034,852 | B2 | * | 4/2006 | Matsuda et al. | 345/690 |
| 7,102,648 | B1 | * | 9/2006 | Holub | 345/589 |
| 7,218,358 | B2 | * | 5/2007 | Chen et al. | 348/658 |
| 7,292,252 | B2 | * | 11/2007 | Matsuda | 345/589 |
| 7,312,779 | B1 | * | 12/2007 | Blevins | 345/102 |
| 7,339,700 | B2 | * | 3/2008 | Ohga et al. | 358/1.9 |
| 2002/0118210 | A1 | * | 8/2002 | Yuasa et al. | 345/589 |
| 2003/0091230 | A1 | * | 5/2003 | Choi et al. | 382/162 |
| 2003/0234785 | A1 | * | 12/2003 | Matsuda et al. | 345/426 |
| 2004/0233082 | A1 | * | 11/2004 | Yoo | 341/118 |

FOREIGN PATENT DOCUMENTS

| JP | 07-067131 A | 3/1995 |
|---|---|---|
| JP | 2005-269600 A | 9/2005 |
| KR | 1996-0040028 A | 11/1996 |
| KR | 10-2003-0083614 A | 10/2003 |
| KR | 10-0527859 B1 | 11/2005 |

* cited by examiner

*Primary Examiner*—Xiao M Wu
*Assistant Examiner*—Charles Tseng
(74) *Attorney, Agent, or Firm*—Sughrue Mion, PLLC

(57) ABSTRACT

A method and an apparatus for calibrating a color property of a monitor used in a system including a color conversion module, a color measurement module and a display module. The method includes storing a target color property and measuring a color property of an image displayed on the display module using the color measurement module and generating an image control signal so as to control the color property of the image displayed on the display module based on the target color property and the measured color property of the image. The image control signal is adaptable to a color conversion scheme of the color conversion module.

25 Claims, 9 Drawing Sheets

METHOD AND APPARATUS FOR CALIBRATING COLOR PROPERTY OF MONITOR

CROSS-REFERENCE TO RELATED APPLICATION

This application is based on and claims priority from Korean Patent Application No. 10-2005-0099898, filed on Oct. 21, 2005 the disclosure of which is incorporated herein in its entirety by reference.

BACKGROUND OF THE INVENTION

1. Field of the Invention

Methods and apparatuses consistent with the present invention relate to calibrating a color property of a monitor, and more particularly, to calibrating a color property of a monitor in such a manner that a color having a color property preset by the user can be output from a monitor.

2. Description of the Related Art

Accuracy and stability are very important factors to be considered when reproducing colors on a color monitor. The term "stable color reproduction" means a color change will not occur on the monitor even if a long time has lapsed. In addition, the term "accurate color reproduction" means an image is reproduced according to color information of the image, which has been input to the monitor. For instance, if the input image is an sRGB image, the monitor must reproduce the image with a color level available from an sRGB standard monitor.

A typical method of ensuring the stability of the monitor is to utilize a color meter called a "calibrator", which is used in a Barco CRT monitor or an EIZO LCD monitor. The user measures white and black of the monitor by using the calibrator, and then corrects the setting status of the monitor when there is a difference between a measured value and a target value, thereby properly maintaining the monitor. Such a procedure is called a "calibration".

In order to accurately reproduce color on the monitor, an emulation technique is necessary in order to emulate the color as if the monitor has a virtual primary different from a real primary. This can be achieved by performing color calibration in the monitor. The emulation technique can be performed using numerical formulas when an accurate characterization model exists. However, since there are limitations in the stability of the monitor and the accuracy of the numerical formula model, the calibrator is utilized for accurate emulation. Thus, the performance of the monitor may vary depending on the monitor calibration system and calibration algorithm.

Conventional calibration techniques for a monitor using a light or a color meter are mainly classified into gamma calibration, white calibration, and color coordinate calibration techniques. In addition, a method of measuring luminance has been suggested that creates a look-up table for gamma calibration in each channel or white calibration.

Most of the above techniques are focused on white and gamma calibration. However, in addition to the white and gamma calibration, the emulation technique for the primary coordinates of the primary is also important, and it is impossible to directly utilize the conventional white calibration scheme for the primary calibration.

According to the conventional method, several colors are measured so as to set parameters, and target values are input by a user so as to process the colors. However, according to the conventional method, accuracy of the color conversion is determined according to accuracy of an output color prediction formula prepared based on measurement values of several colors, so the accuracy of the color conversion corresponding to input target values may not be ensured.

SUMMARY OF THE INVENTION

Accordingly, the present invention has been made to address the above-mentioned problems occurring in the prior art, and an aspect of the present invention is to provide a method and an apparatus for gradually obtaining a target color property based on a preset value by setting parameters for converting colors output from a monitor.

Another aspect of the present invention is to provide a method and an apparatus capable of stably converting various colors, which are displayed on a monitor, by repeatedly setting conversion parameters relative to various colors.

The present invention may not be limited to the above aspects and those skilled in the art will appreciate other aspects of the present invention from the following description.

In order to accomplish the above aspects, there is provided a method of calibrating a color property of a monitor used in a system including a color conversion module, a color measurement module and a display module, the method including: storing a target color property; and measuring a color property of an image displayed on the display module using the color measurement module and generating an image control signal so as to control the color property of the image displayed on the display module based on the target color property and the measured color property of the image, wherein the image control signal is adaptable to a color conversion scheme of the color conversion module.

According to another aspect of the present invention, there is provided a system including: a storage module that stores a target color property; a display module that displays an image; a color measurement module that measures a color property of the image displayed on the display module; and a color conversion module that receives a measurement value of the image displayed on the display module from the color measurement module, and generates an image control signal so as to control the color property of the image displayed on the display module based on the target color property and the measured color property of the image, wherein the image control signal is adaptable to a color conversion scheme of the color conversion module.

According to still another aspect of the present invention, there is provided an apparatus that controls monitor calibration, the apparatus including: a storage unit that stores a target color property to be output through an output device; a parameter calculation unit that calculates conversion parameters for converting a color property of at least one color into the target color property; a parameter transmission unit that transmits the conversion parameters to the output device; and a measurement value reception unit that receives the color property of the at least one color when the output device outputs the at least one color by converting the at least one color according to the conversion parameters, wherein the parameter calculation unit calculates a difference between the color property received in the measurement value reception unit and the target color property stored in the storage unit, the parameter transmission unit transmits the conversion parameters to the output device such that the conversion parameters can be set in the output device when the difference is equal to or less than a predetermined threshold, and the parameter calculation unit re-calculates the image control signal for converting the color property of the at least one color into the target color property when the difference exceeds the predetermined threshold.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1:
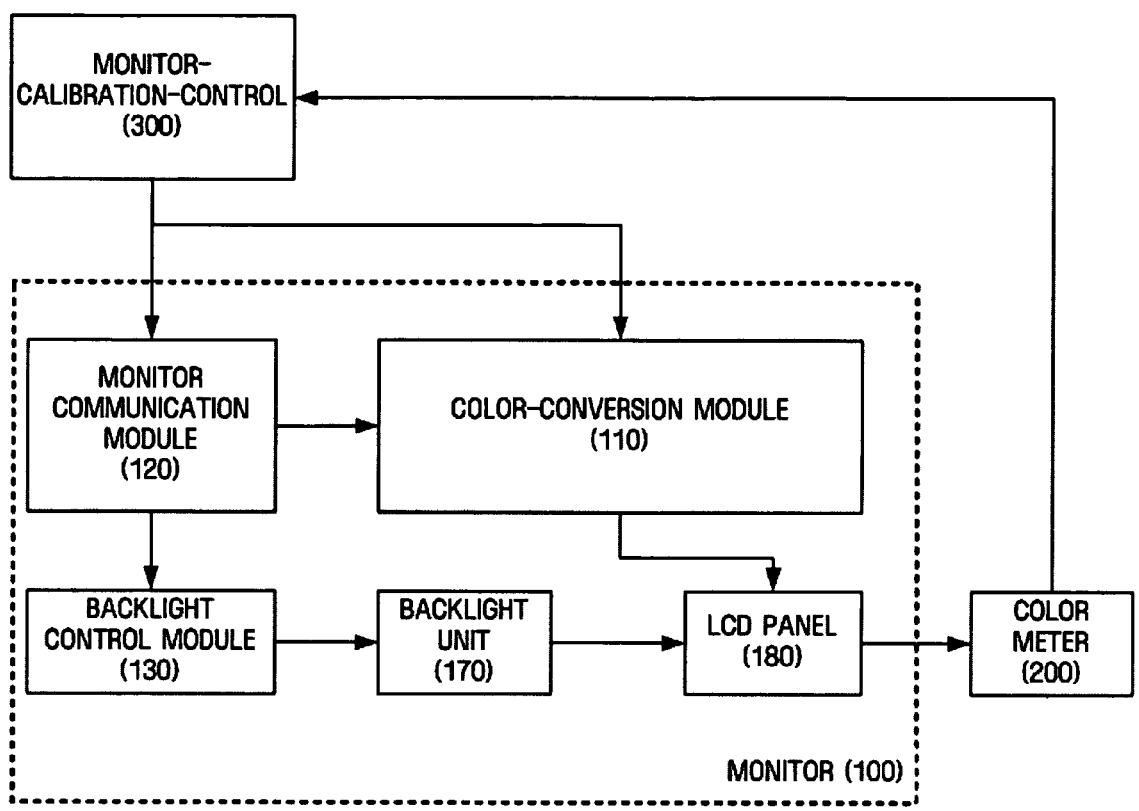
FIG. 1 is a view illustrating the structure of a monitor capable of outputting colors by calibrating a color property thereof and peripheral devices supporting the color property calibration according to one exemplary embodiment of the present invention.

Aspects of the present invention, and ways to achieve them will be apparent from exemplary embodiments of the present invention as will be described below with reference to the accompanying drawings. However, the scope of the present invention is not limited to such exemplary embodiments, and the present invention may be realized in various forms. The exemplary embodiments to be described below are provided to properly disclose the present invention and assist those skilled in the art to completely understand the present invention. The present invention is defined only by the scope of the appended claims. Also, the same reference numerals are used to designate the same elements throughout the specification.

The present invention is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

FIG. 1 is a view illustrating the structure of a monitor capable of outputting colors by calibrating a color property thereof, and peripheral devices supporting the color property calibration according to one exemplary embodiment of the present invention.

The term "section", "module" or "table", as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and the modules can operate at least one CPU provided in a device.

The monitor 100 shown in FIG. 1 includes a color conversion module 110, a monitor communication module 120, a backlight control module 130, a backlight unit 170, and an LCD panel 180. In addition, a color meter 200 is provided to measure a color property of the monitor 100. A monitor-calibration-control 300 generates color conversion information by receiving the measurement result of the color meter 200 in order to control the color conversion procedure of the monitor 100. If the monitor 100 outputs an image through the LCD panel 180, the color meter 200 measures the property of the color. For instance, the color meter 200 measures x, y and z tristimulus values of the color displayed on the monitor. The x, y and z tristimulus values are transferred to the monitor-calibration-control 300, so that the monitor-calibration-control 300 calculates color conversion information to be used in the color conversion module 110 or the backlight control module 130. Then, the calculated color conversion information is transferred to the color conversion module 110 or the backlight control module 130 through the monitor communication module 120.

The monitor communication module 120 receives model parameters and image signals, which are applied to the color conversion module 110 or the backlight control module 130, from the monitor-calibration-control 300 and then sends them to the color conversion module 110 or the backlight control module 130.

The color conversion module 110 converts an input signal such that the input signal has an output value, which the user intends to obtain through monitor calibration. The color conversion module 110 performs the mapping or conversion process such that the input RGB value can be mapped or converted into another RGB value.

The backlight control module 130 controls the brightness of the backlight unit 170 based on information transmitted thereto through the monitor communication module 120, thereby controlling the brightness of the monitor panel. The backlight unit 170 not only totally controls the brightness of the monitor panel, but also independently controls the brightness of each channel.

The monitor-calibration-control 300 may be provided in the form of a program installed in the computer. The monitor-calibration-control 300 reads the x, y and z tristimulus values of the color displayed on the monitor, which are measured by the color meter 200 (or a color measurement module), calculates the model parameters, which are applied to the color conversion module 110 or the backlight control module 130, and sends the model parameters to the monitor communication module so as to control the monitor calibration procedure. The monitor calibration procedure refers to a process for obtaining an optimum parameter required for the color conversion module 110 in order to acquire target x, y and z tristimulus values of the color, which reflect the monitor characteristic input by the user, based on x, y and z tristimulus values of the color displayed on the monitor in the form of a dRodGodBo signal through the color conversion module 110 and the LCD panel 180 when a predetermined color dRidGidBi has been input into the monitor. The procedure for calculating the model parameter will be described later. The LCD panel 180 is a display module for displaying an image.

The model parameter calculated by the monitor-calibration-control 300 is transferred to the color conversion module 110 and the backlight control module 130 through the monitor communication module 120. Thus, the color signal input into the monitor is calibrated in the color conversion module 110 and the backlight control module 130 based on the model parameter and then the calibrated color signal is output.

According to an exemplary embodiment of the present invention, an image control signal used for controlling an image input into the monitor may include a conversion parameter or a backlight control signal. Thus, a predetermined color input into the monitor can be output in the form of a target color, which has been set by the user, by means of the image control signal.

Figure 2:
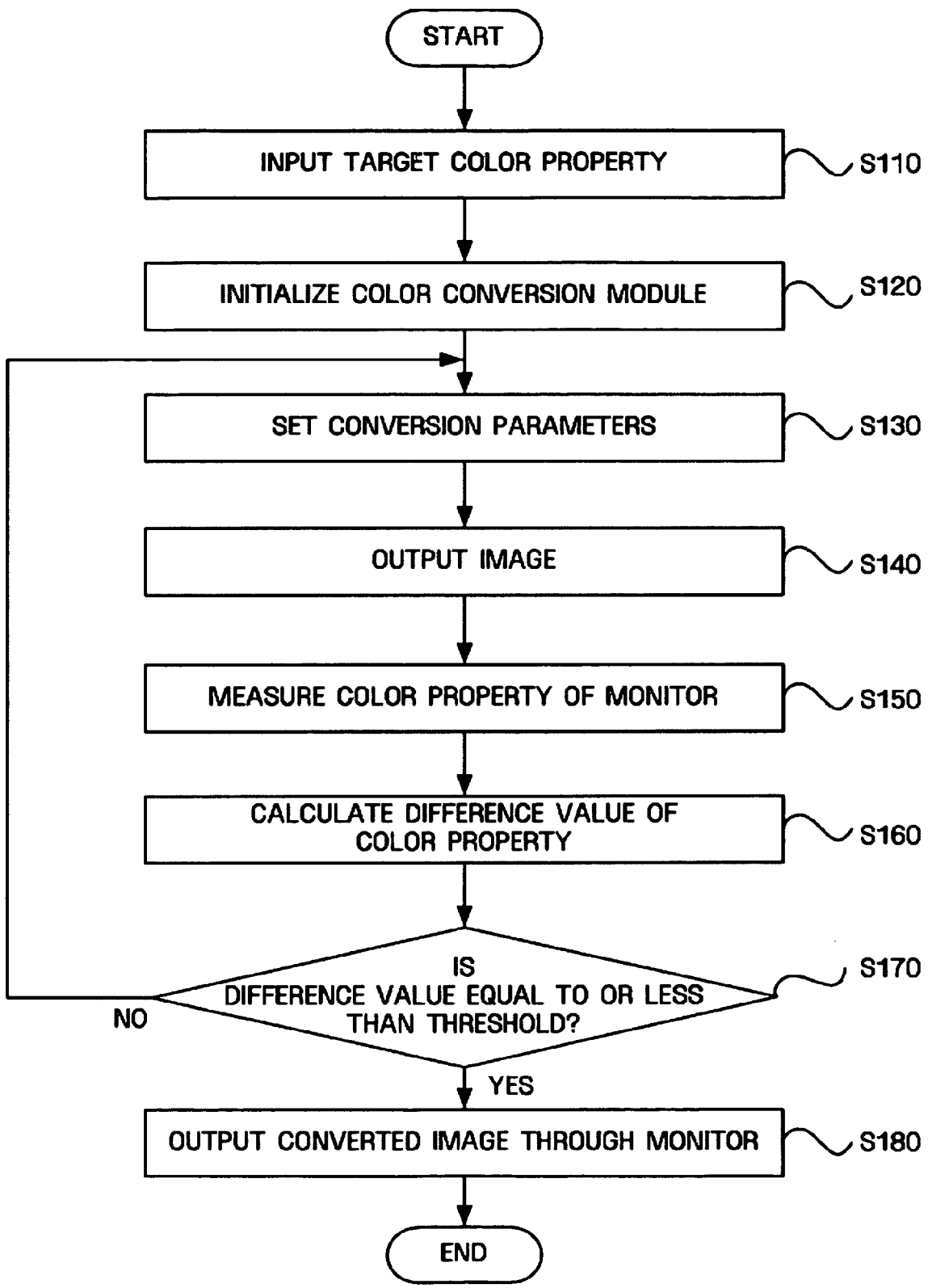
FIG. 2 is a flowchart illustrating the procedure for calibrating a color property of a monitor, which is performed by means of a monitor-calibration-control, a color conversion module, and a color meter according to one exemplary embodiment of the present invention.

FIG. 2 is a flowchart illustrating the procedure for calibrating the color property of the monitor, which is performed by means of the monitor-calibration-control 300, the color conversion module 110, and the color meter 200 according to one exemplary embodiment of the present invention. First, the user inputs a target color property of the monitor through the monitor-calibration-control 300 (S110). Then, the color conversion module 110 is initialized (S120). At this time, the monitor-calibration-control 300 controls the color conversion module 110 through the monitor communication module 120 so as to initialize the color conversion module. In addition, the monitor-calibration-control 300 sets parameters required for adjusting setting values of the color conversion module 110 based on the target color property of the monitor input by the user (S130). The setting value is stored in the color conversion module 110 through the monitor communication module. In addition, the monitor-calibration-control 300 outputs a predetermined color to the monitor (S140). At this time, the predetermined color may be converted according to the setting value of the color conversion module 110, which has been set in step S130. Then, the color meter 200 measures the property of color displayed on the monitor (S150). Next, a difference between the measured color property and the target color property is calculated (S160). If the difference is within a predetermined range, it means that the color conversion module 110 has been set such that the color can be output with the target color property so that the color having the calibrated color property is output through the monitor (S180).

Meanwhile, if it is determined in step S170 that the difference between the measured color property and the target color property is out of the predetermined range, steps S130 through S160 are repeated until the color conversion parameters satisfying the target color property have been obtained.

Figure 3:
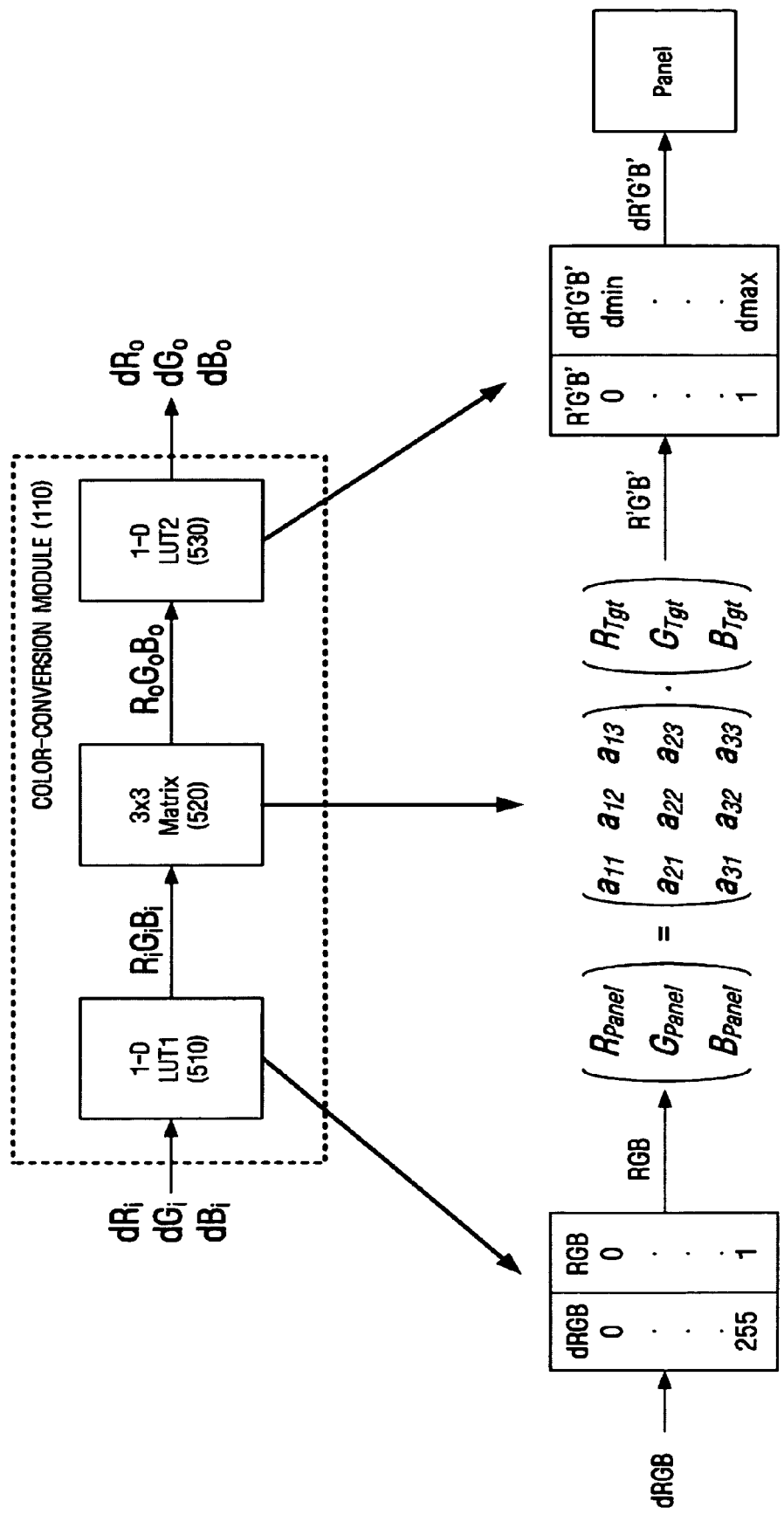
FIG. 3 is a view illustrating the procedure for converting a color property using a color conversion module according to one exemplary embodiment of the present invention.

FIG. 3 is a view illustrating the procedure for converting the color property using the color conversion module 110 according to one exemplary embodiment of the present invention.

The color conversion module 110 includes a first lookup table 510, a 3×3 matrix 520 and a second lookup table 530.

The first lookup table 510 is used to convert input 8-bit signals (dR, dG, and dB) corresponding to the target gamma into regular R, G, and B signals in each channel. The 3×3 matrix 520 is used for converting RiGiBi signals obtained from the first lookup table 510 into RoGoBo signals required for reproducing a target color coordinate. The RoGoBo signals are output in the form of dRo, dGo and dBo digital signals, which are applied to the panel later, through the second lookup table 530.

In order to prepare the above 3×3 matrix or the lookup tables, the monitor-calibration-control 300 obtains a matrix or a lookup table used for color conversion adaptable to achieving the target color coordinate. Then, the result obtained from the matrix and the lookup table is compared with the target value. If the result value does not match with the target value, the setting value of the matrix or the lookup table is readjusted and the color coordinate is again calculated based on the readjusted setting value of the matrix and the lookup table.

The method for obtaining the matrix or lookup table having the readjusted setting value is described below. Tristimulus values ($X_{msr}$, $Y_{msr}$, and $Z_{msr}$), which are obtained by measuring color of the monitor with applying calculated panel digital values, are compared with final target tristimulus values ($X_{tgt}$, $Y_{tgt}$, and $Z_{tgt}$) and the ratio of the final target tristimulus values ($X_{tgt}$, $Y_{tgt}$, and $Z_{tgt}$) to the tristimulus values ($X_{msr}$, $Y_{msr}$, and $Z_{msr}$) is multiplied by $n^{th}$ target tristimulus values ($X_{tgt,n}$, $Y_{tgt,n}$, $Z_{tgt,n}$), which are obtained from the $n^{th}$ execution, thereby establishing $(n+1)^{th}$ target tristimulus values ($X_{tgt,n+1}$, $Y_{tgt,n+1}$, and $Z_{tgt,n+1}$), as can be seen in Equation 1:

$$\ldots \quad (1)$$

The $(n+1)^{th}$ target tristimulus values are applied to the matrix as shown in Equation 2, thereby calculating $(n+1)^{th}$ regular monitor luminance ($R_{n+1}$, $G_{n+1}$, $B_{n+1}$). In addition, the 3×3 matrix is formed based on the calculated value. The 3×3 matrix is applied to the color conversion module 110, and then $$X_{tgt,n+1} = X_{tgt,n} \cdot \frac{X_{tgt}}{X_{msr}}$$

$$Y_{tgt,n+1} = Y_{tgt,n} \cdot \frac{Y_{tgt}}{Y_{msr}}$$

$$Z_{tgt,n+1} = Z_{tgt,n} \cdot \frac{Z_{tgt}}{Z_{msr}}$$

is converted into digital values through the second lookup table such that the digital values can be applied to the panel. In addition, if the difference between the tristimulus values ($X_{msr}$, $Y_{msr}$, and $Z_{msr}$), which are obtained by measuring color of the monitor with applying converted digital values, and the final target tristimulus values ($X_{tgt}$, $Y_{tgt}$, and $Z_{tgt}$) is equal to or less than a predetermined threshold, the values obtained from the matrix or the lookup table used for the above conversion procedure can be applied to the color conversion module as final values. In the case of RGB colors, the predetermined threshold can be arithmetically calculated. For example, the difference of the predetermined threshold in R, G and B colors may not exceed 10 or the difference of the predetermined threshold in R, G and B colors is equal to or less than 2.

$$\begin{pmatrix} R_{n+1} \\ G_{n+1} \\ B_{n+1} \end{pmatrix} = \begin{pmatrix} X_{panel,r} & X_{panel,g} & X_{panel,b} \\ Y_{panel,r} & Y_{panel,g} & Y_{panel,b} \\ Z_{panel,r} & Z_{panel,g} & Z_{panel,b} \end{pmatrix}^{-1} \cdot \begin{pmatrix} X_{tgt,n+1} \\ Y_{tgt,n+1} \\ Z_{tgt,n+1} \end{pmatrix} \quad (2)$$

Figure 4:
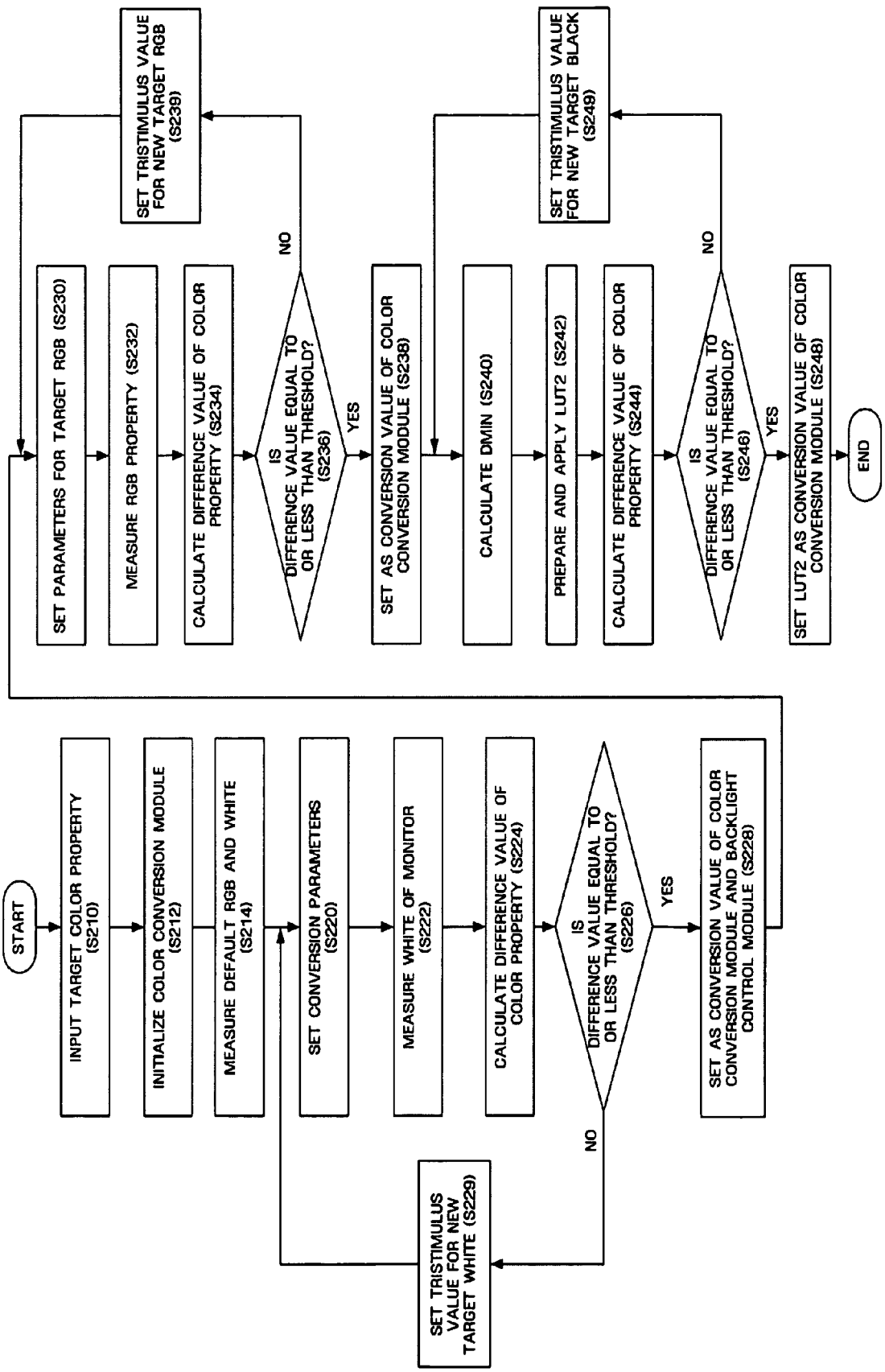
FIG. 4 is a flowchart illustrating the procedure for calculating an optimum color conversion parameter, which is required for the procedure shown in FIG. 3, using a monitor-calibration-control according to one exemplary embodiment of the present invention.

FIG. 4 is a flowchart illustrating the procedure for calculating an optimum color conversion parameter, which is required for the procedure shown in FIG. 3, using the monitor-calibration-control 300 according to one exemplary embodiment of the present invention. First, the user inputs a target color property of the monitor through the monitor-calibration-control 300 (S210). The target color property includes the white luminance and chromaticity, primary chromaticity coordinate, black luminance, or target gamma. The target color property is stored in the monitor-calibration-control 300 so as to serve as a target value for setting the parameters of the color conversion module 110. Then, the color conversion module 110 is initialized (S212). At this time, the monitor-calibration-control 300 sends an initialization command through the monitor communication module 120 so as to initialize the color conversion module 110. Then, default RGB primary and white of the monitor are measured (S214). The measured values are used for creating the matrix shown in Equation 1. Although FIG. 4 represents that the tristimulus values are set in the order of white, RGB primary and black, this is for illustrative purposes only and the above order can be changed. In addition, only the tristimulus values of the RGB primary can be set. It is also possible to set the tristimulus values of white and black, exclusively.

After the 3×3 matrix value and an amount of backlight to be controlled, which are necessary to output target white, have been calculated based on Equations 1 and 2, parameters are set according to the calculated values (S220). Then, the image is displayed on the monitor according to the parameter values and the white property of the monitor is measured (S222). After that, the difference between the measured color property and the target color property is calculated (S224). Then, the difference value is compared with a predetermined threshold (S226) so as to determine similarity between the measured color property and the target color property. At this time, if the difference value is equal to or less than the predetermined threshold, it means that white calibration for the input color has been completed, so that the calibrated values are set as the conversion values of the color conversion module 110 and the backlight control module 130 (S228). The conversion values include 3×3 matrix values of the color conversion module 110 shown in FIG. 3. Only the values of the lookup table may serve as the conversion value depending on the property of the backlight control module 130.

In contrast, if the difference value exceeds the predetermined threshold, it means that the white calibration for obtaining the target color property has not been completed, so that tristimulus values for new target white are set based on the previous procedure (S229). Then, steps 220 to 226 are performed while applying the tristimulus values for new target white to Equations 1 and 2.

When the conversion values of the color conversion module 110 and the backlight control module 130 have been set through the white calibration in step (S228), a conversion value for converting the RGB primary coordinate is set as a next operation. First, the 3×3 matrix value for outputting the target RGB primary coordinate is calculated based on Equations 1 and 2, and then the parameters are established (S230). Then, the image is displayed on the monitor according to the parameter values and the RGB property of the monitor is measured (S232). After that, similar to the procedure for the white calibration, the difference between the measured color property and the target color property is calculated (S234). If the difference value calculated with respect to all primaries is equal to or less than the predetermined threshold, it means that RGB primary calibration for converting the color property into the target color property has been completed for each RGB primary, so that the conversion value is readjusted through secondary RGB calibration such that the sum of RGB forms white and the readjusted conversion value is set as the conversion value of the color conversion module 110 (S238). The conversion value includes 3×3 matrix values shown in FIG. 3.

In contrast, if the difference value exceeds the predetermined threshold, it means that the RGB primary calibration for obtaining the target color property has not been completed, so that tristimulus values for new target RGB are set based on the previous procedure (S239). Then, steps 230 to 236 are performed while applying the tristimulus values for new target RGB to Equations 1 and 2.

When the white calibration and RGB primary calibration have been completed, black calibration is performed as a next operation. The procedure for the black calibration is similar to those of the white calibration and RGB primary calibration. That is, a minimum digital value (dmin), which is input into a panel so as to output the target black, is calculated (S240). Then, the calculated minimum digital value is applied to the second lookup table 530 shown in FIG. 3 (S242). Next, the difference between the measured color property and the target color property is calculated (S244). If the difference value is equal to or less than the predetermined threshold, it means that black calibration for converting the color property into the target color property has been completed, so that the conversion value obtained from the second lookup table 530 is set as the conversion value of the color conversion module (S248).

In contrast, if the difference value exceeds the predetermined threshold, it means that the black calibration for obtaining the target color property has not been completed, so that tristimulus values for new target black are set based on the previous procedure (S249). Then, steps 240 to 246 are performed while applying the tristimulus values for new target black to Equations 1 and 2.

Equations 1 and 2 may serve as parameters used for converting the color property, which will be described below.

Figure 5:
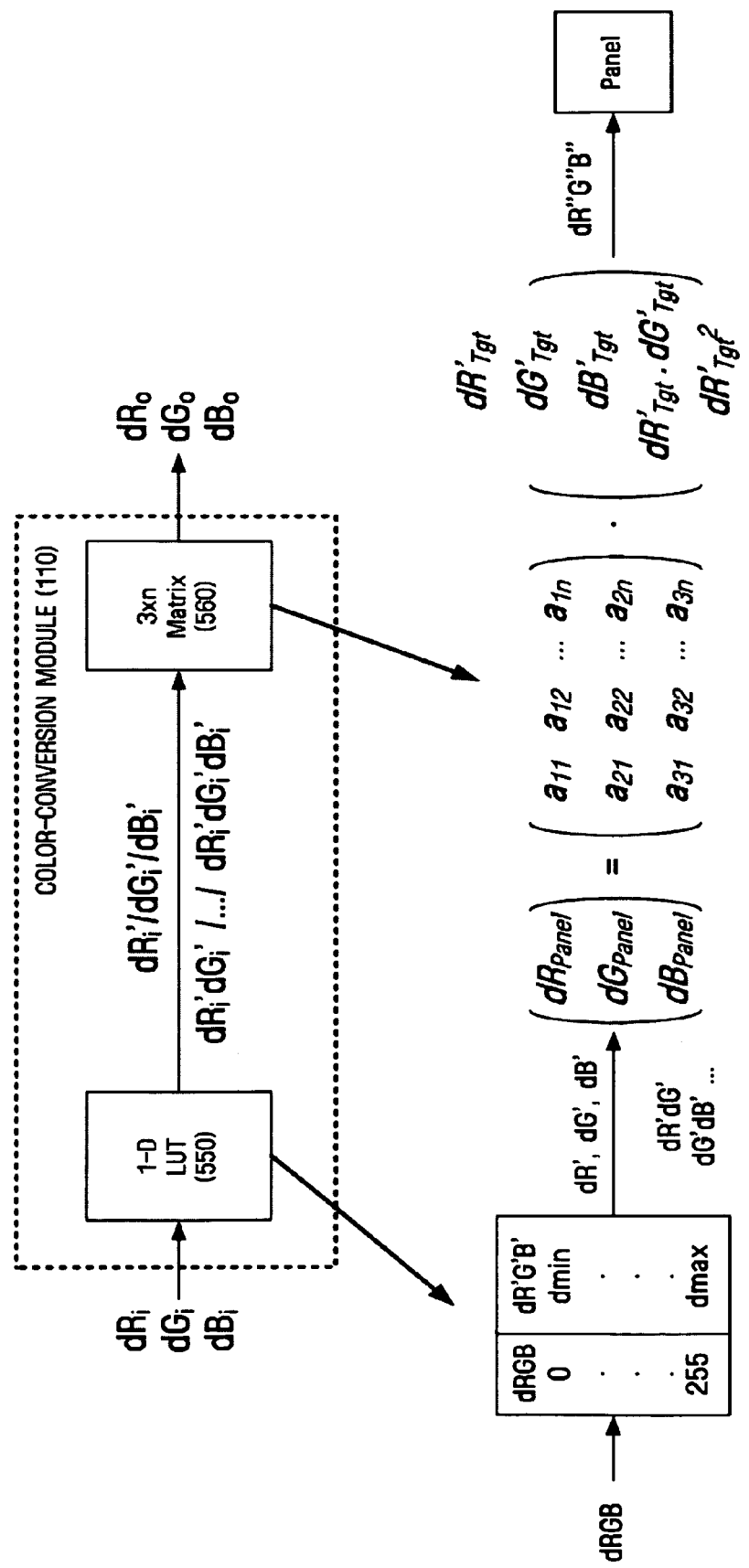
FIG. 5 is a view illustrating the procedure for converting a color property using a color conversion module according to another exemplary embodiment of the present invention.

FIG. 5 is a view illustrating the procedure for converting the color property using the color conversion module 110 according to another exemplary embodiment of the present invention.

The color conversion module 110 includes a one-dimension lookup table (1-D LUT) 550 and a 3×n matrix 560. Here, n is greater than 3. Different from the 1-D LUT 510 shown in FIG. 3, the 1-D LUT 550 represents values in a range between a minimum digital value (dmin) and a maximum digital value (dmax), other than between 0 and 1.

The lookup table 550 is used to convert an input digital signal into a panel digital signal such that a target gamma can be obtained on the panel when 8-bit signals of each channel are applied to the panel. The signal, which has been converted to have the panel digital value through the lookup table 550, is divided into n signals having RGB channel values, and then the n signals are applied to the 3×n matrix, so that the n signals are converted into final digital signals dR", dG" and dB", which can be applied to the panel.

For instance, if n is 10 in the 3×n matrix, the n signals having the RGB channel values are represented as dR', dG', dB', dR'dG', dG'dB', dB'dR', dR'dR', dG'dG', dB'dB', and dR'dG'dB'.

For the purpose of "primary calibration", a panel digital value satisfying the target x, y and z with respect to M(>n) test colors is obtained, and then the 3×n matrix is output based on the relationship between the digital values of the test colors and the panel digital value.

For example, as shown in Equation 3, it is possible to obtain the 3×n matrix, which is used when conversion is performed between a $D_{Tgt}$ matrix, which is a set of target RGB values for the M test colors, and a $D_{panel}$ matrix, which is a combination of panel digital values obtained by converting input digital values.

$$D_{panel} = A \cdot D_{Tgt} \qquad (3)$$

$$A = [D_{panel} \cdot D_{Tgt}^T] \cdot [D_{Tgt} \cdot D_{Tgt}^T]^{-1} \qquad (4)$$

Meanwhile, Equation 5 shows the relationship among the $D_{panel}$ matrix, the $D_{Tgt}$ matrix and A shown in Equations 4 and 5:

$$\begin{pmatrix} dR1_{Panel} & dR2_{Panel} & \ldots & dRM_{Panel} \\ dG1_{Panel} & dG2_{Panel} & \ldots & dGM_{Panel} \\ dB1_{Panel} & dB2_{Panel} & \ldots & dBM_{Panel} \end{pmatrix} = \qquad (5)$$

$$\begin{pmatrix} a_{11} & a_{12} & \ldots & a_{1n} \\ a_{21} & a_{22} & \ldots & a_{2n} \\ a_{31} & a_{32} & \ldots & a_{3n} \end{pmatrix} \cdot \begin{pmatrix} dR1'_{Tgt} & dR2'_{Tgt} & \ldots & dRM'_{Tgt} \\ dG1'_{Tgt} & dG2'_{Tgt} & \ldots & dGM'_{Tgt} \\ dB1'_{Tgt} & dB2'_{Tgt} & \ldots & dBM'_{Tgt} \\ dR1'^2_{Tgt} & dR2'^2_{Tgt} & \ldots & dRM'^2_{Tgt} \\ dG1'^2_{Tgt} & dG2'^2_{Tgt} & \ldots & dGM'^2_{Tgt} \\ \vdots & \vdots & \vdots & \vdots \end{pmatrix}$$

In Equation 5, the $D_{panel}$ matrix consists of dR, dG, and dB values for the M test colors. At this time, the dR, dG, and dB values can be obtained from the lookup table. The $D_{Tgt}$ matrix consisting of combination of target RGB values for the M test colors may include dR', dG', dB', dR'², dG'², dB'², dR'·dG', dG'·dB', dR'·dB', and dR'·dG'·dB'. The matrix A, which is interposed between the $D_{panel}$ matrix and the $D_{Tgt}$ matrix, can be obtained through Equation 4. That is, the matrix A can be obtained in the form of the 3×n matrix as shown in FIG. 5 by repeatedly adjusting the target values such that the 3×n matrix can be applied to the color conversion module.

Figure 6:
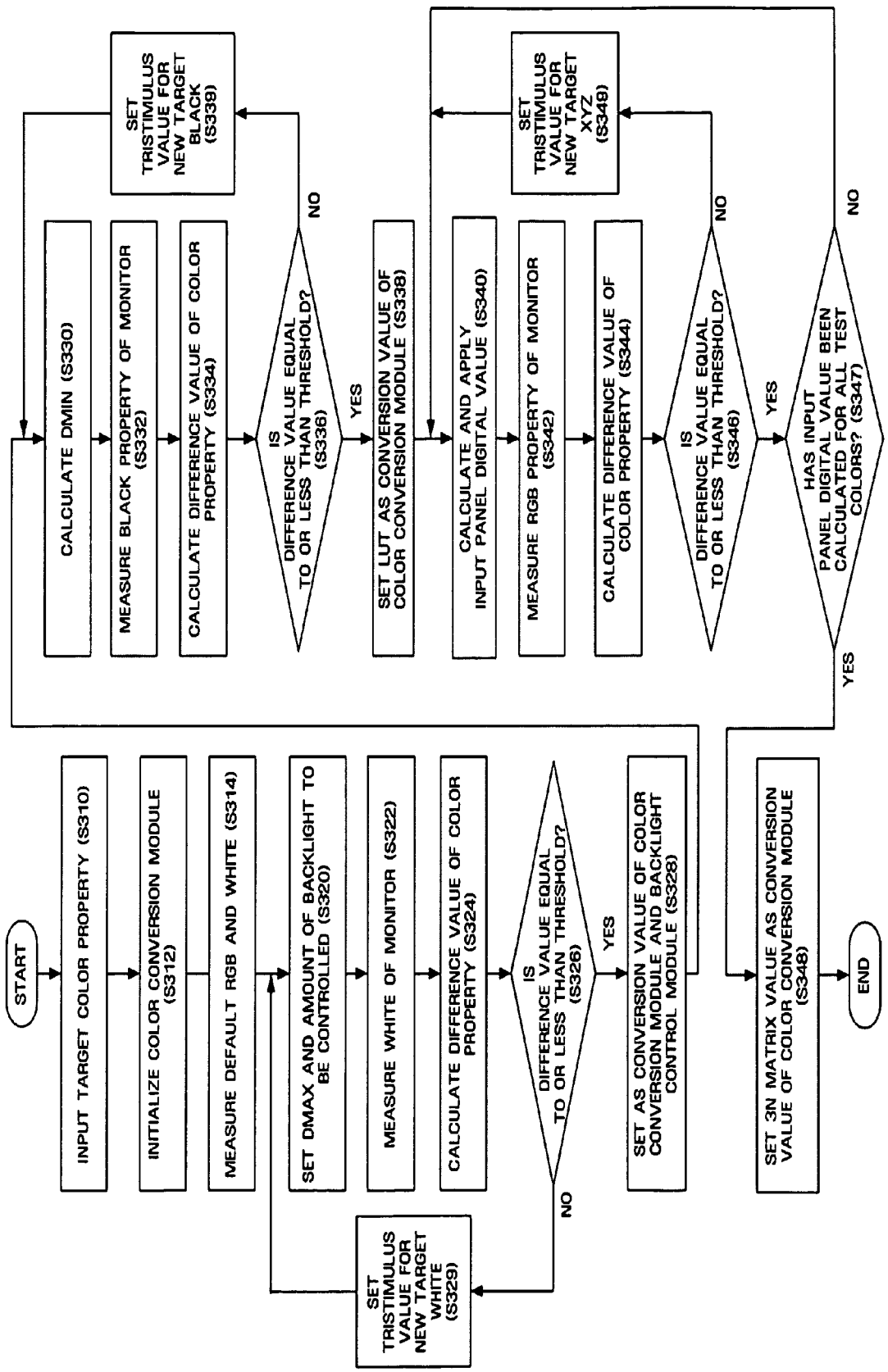
FIG. 6 is a flowchart illustrating the procedure for calculating an optimum color conversion parameter, which is required for the procedure shown in FIG. 5, using a monitor-calibration-control according to another exemplary embodiment of the present invention.

FIG. 6 is a flowchart illustrating the procedure for calculating an optimum color conversion parameter, which is required for the procedure shown in FIG. 5, using the monitor-calibration-control 300 according to another exemplary embodiment of the present invention.

The user inputs a target color property of the monitor (S310). The target color property is stored in the monitor-calibration-control 300 so as to serve as a target value for setting the parameters of the color conversion module. Then, the color conversion module 110 is initialized (S312). At this time, the monitor-calibration-control 300 sends an initialization command through the monitor communication module 120 so as to initialize the color conversion module 110. Then, default RGB primary and white of the monitor are measured (S314). The measured values are used for creating the matrix shown in Equation 1. Although FIG. 6 represents that the tristimulus values are set in the order of white, black and RGB primary, this is for illustrative purposes only and the above order can be changed. In addition, the tristimulus values of the RGB primary can be set, exclusively.

First, a maximum panel digital value (dmax) and an amount of backlight to be controlled are calculated so as to output target white and then parameters are set according to the calculated values. The parameters are applied to the color conversion module 110 and the backlight control module 130 (S320). Then, the image is displayed on the monitor according to the parameter values and the white property of the monitor is measured (S322). After that, the difference between the measured color property and the target color property is calculated (S324). Then, the difference value is compared with a predetermined threshold (S326) so as to determine similarity between the measured color property and the target color property. At this time, if the difference value is equal to or less than the predetermined threshold, it means that white calibration for the input color has been completed, so that the calibrated values are set as the conversion values of the color conversion module 110 and the backlight control module (S328). The conversion value of the color conversion module 110 includes the maximum digital value of the lookup table as shown in FIG. 5.

In contrast, if the difference value exceeds the predetermined threshold, it means that the white calibration for obtaining the target color property has not been completed, so that tristimulus values for new target white are set based on the previous procedure (S329). Then, steps 320 to 326 are performed while applying the tristimulus values for new target white to Equations 1 and 2 until the target color property or the color property similar to the target color property has been obtained.

When the maximum digital value has been output and conversion values of the color conversion module and the backlight control module have been set through the white calibration in step S328, black calibration is performed as a next operation. In order to output target black, a minimum panel digital value of each channel is calculated (S330). Then, the calculated value is applied to the color conversion module 110. At this time, the calculated value corresponds to the minimum panel digital value of the lookup table 550 shown in FIG. 5. After that, the image is displayed on the monitor and then the black color property of the monitor is measured (S332). Thereafter, the difference between the measured black color property and the target black color property is calculated (S334). If the difference value is equal to or less than the predetermined threshold, it means that the black calibration for converting the color property into the target color property has been completed, so that the conversion value of the lookup table 550 is set as the conversion value of the color conversion module (S338).

In contrast, if the difference value exceeds the predetermined threshold, it means that the black calibration for obtaining the target color property has not been completed, so that tristimulus values for new target black set based on the previous procedure (S339). Then, steps 330 to 336 are performed while applying the tristimulus values for new target black to Equations 1 and 2. The above white calibration and black calibration are similar to the white calibration and black calibration shown in the flowchart of FIG. 4.

When the minimum and maximum digital values (dmin and dmax) have been set, a conversion value for the RGB primary conversion is set. As shown in FIG. 5, the conversion matrix value can be obtained based on the relationship between k input values and k target values corresponding to the k input values. Therefore, input panel digital values ($dR_{k\_panel}$, $dG_{k\_panel}$, and $dB_{k\_panel}$) are calculated and applied in order to repeatedly obtain target x, y and z tristimulus values ($dR_{k\_tgt}$, $dG_{k\_tgt}$, and $dB_{k\_tgt}$) for test colors (S340). Then, the image is displayed on the monitor according to the calculated values and the RGB property of the monitor is measured (S342). After that, the difference between the measured color property and the target color property is calculated (S344). If the difference value exceeds the predetermined threshold, it means that the matrix values for converting the color property into the target color property are incorrect, so that new target x, y and z tristimulus values are set (S349). Then, steps 340 to 346 are performed while applying the new target x, y and z tristimulus values to Equations 1 and 2.

Even if when the difference value is equal to or less than the threshold value at a $k^{th}$ test color, since the above procedure must be performed with respect to all test colors, it is determined whether the panel digital values have been calculated for all test colors (S347). If the panel digital values have been calculated for some test colors, other than all test colors, steps 340 to 346 are performed. However, if the matrix conversion value for all test colors corresponds to the target color property or is different from the target color property within a predetermined threshold, it means that the conversion has been completed, so that the 3×n matrix value is set as the conversion value of the color conversion module (S348).

Figure 7:
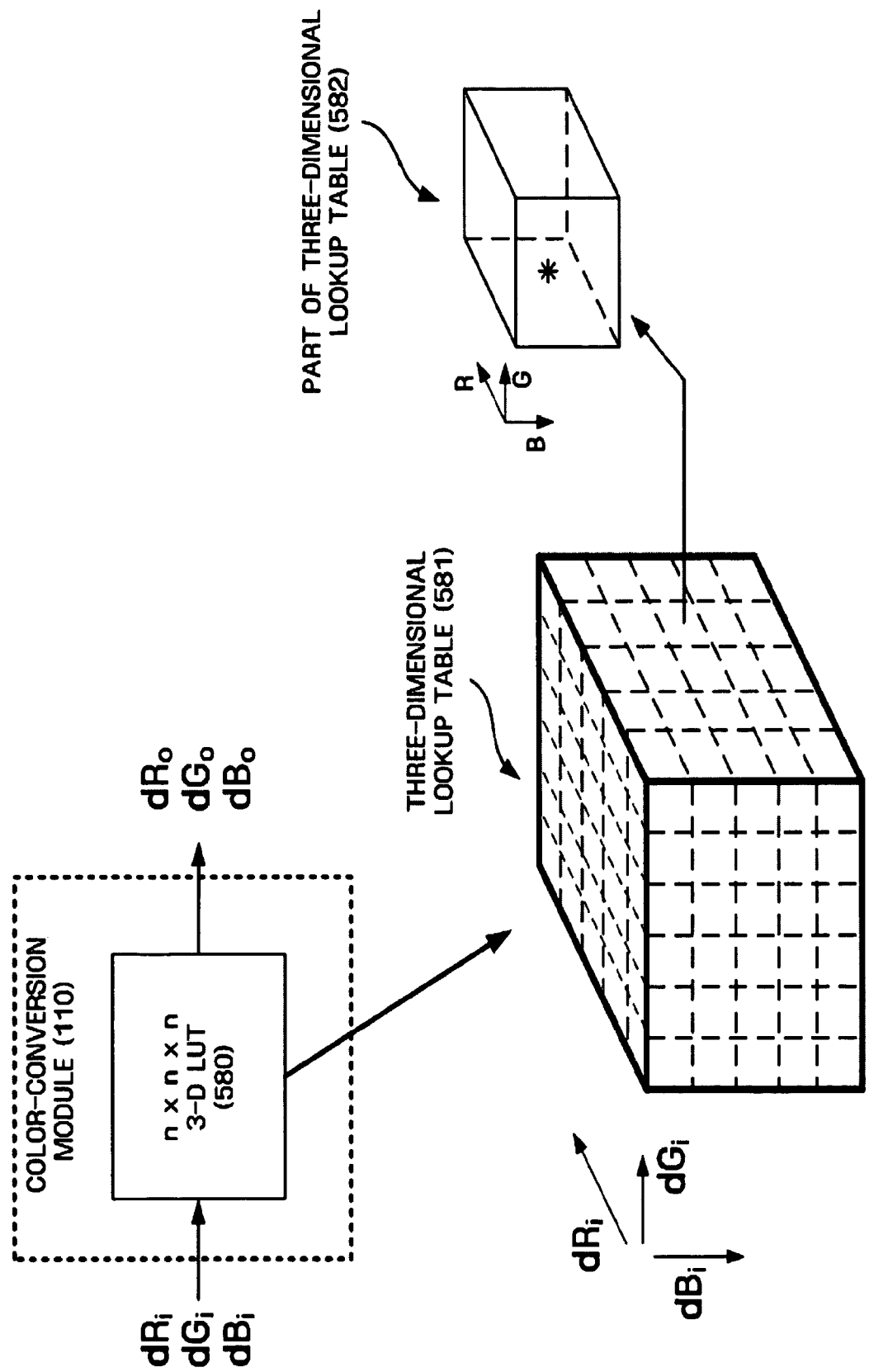
FIG. 7 is a view illustrating the procedure for converting a color property using a color conversion module according to still another exemplary embodiment of the present invention.

FIG. 7 is a view illustrating the procedure for converting a color property using the color conversion module 110 according to still another exemplary embodiment of the present invention. Different from the color conversion module shown in FIGS. 3 and 5, the color conversion module shown in FIG. 7 further includes an n×n×n lookup table 580. A mapping process is performed in order to convert input RGB values, so the conversion value can be set for each RGB value or can be set for RGB values within a predetermined range. For instance, a three-dimensional lookup table 581 shown in FIG. 7 maps input values dRi, dGi, and dBi into output values dRo, dGo, and dBo. In addition, reference numeral 582 represents a part of the three-dimensional lookup table 581, which defines a partial region of the RGB. If the part 582 defines the regions of R (64-79), G (32-47) and B (48-63), when the input values dRi, dGi, and dBi are 70, 35 and 53, respectively, the output values dRo, dGo, and dBo can be obtained by calculating mapping positions at the part 582 while applying interpolation according to the above RGB regions.

Figure 8:
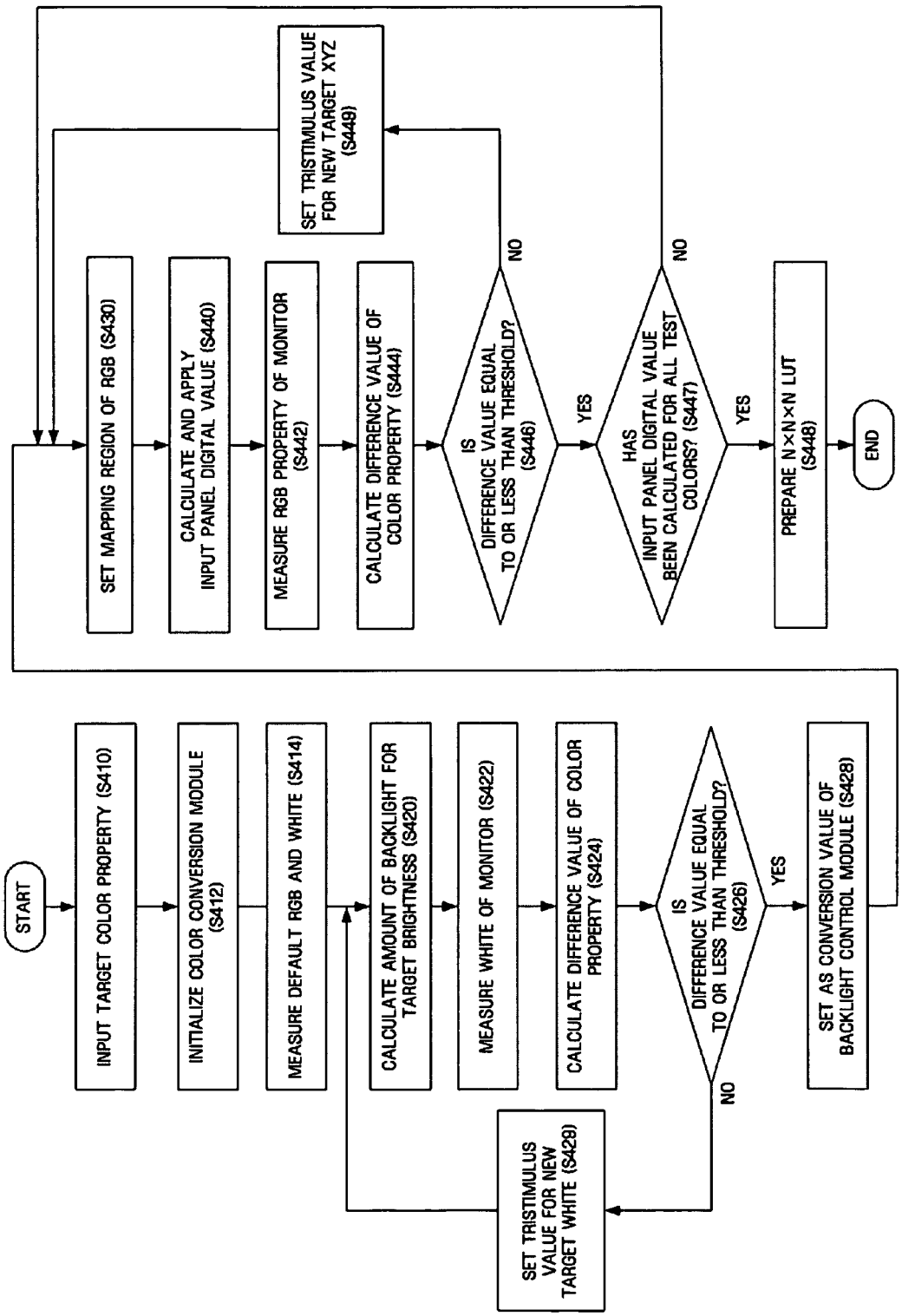
FIG. 8 is a flowchart illustrating the procedure for calculating an optimum color conversion parameter, which is required for the procedure shown in FIG. 7, using a monitor-calibration-control according to still another exemplary embodiment of the present invention.

FIG. 8 is a flowchart illustrating the procedure for calculating an optimum color conversion parameter, which is required for the procedure shown in FIG. 7, using the monitor-calibration-control 300 according to still another exemplary embodiment of the present invention.

First, the user inputs a target color property of the monitor (S410). The target color property is stored in the monitor-calibration-control 300 so as to serve as a target value for setting the parameters of the color conversion module. Then, the color conversion module 110 is initialized (S412). At this time, the monitor-calibration-control 300 sends an initialization command through the monitor communication module so as to initialize the color conversion module 110. Then, default RGB primary and white of the monitor are measured (S414).

After that, information required for controlling the backlight unit 170 to achieve target brightness is calculated and set in the backlight control module (S420). Then, the image is displayed on the monitor according to the control information set in the backlight control module and the white property of the monitor is measured (S422). Then, the difference between the measured color property and the target color property is calculated (S424). The difference value is compared with a predetermined threshold (S426) so as to determine similarity between the measured color property and the target color property. At this time, if the difference value is equal to or less than the predetermined threshold, it means that white calibration for the input color has been completed, so that the measured values are set as the conversion values of the backlight control module (S428).

In contrast, if the difference value exceeds the predetermined threshold, it means that the white calibration for obtaining the target color property has not been completed, so that tristimulus values for new target white are set based on the previous procedure (S429). Then, steps 420 to 426 are repeated while applying the tristimulus values for new target white to Equations 1 and 2 until the target color property or the color property similar to the target color property has been obtained.

When the white calibration has been completed, the three-dimensional lookup table 580 as shown in FIG. 7 is prepared based on a plurality of RGB test colors. The RGB test colors are representative colors for each region of the three-dimensional lookup table 580 shown in FIG. 7. In FIG. 8, it is assumed that m R regions, m G regions, and m B regions are provided. Therefore, input panel digital values ($dR_{k\_panel}$, $dG_{k\_panel}$) and $dB_{k\_panel}$) are calculated and applied in order to repeatedly obtain target x, y and z tristimulus values ($dR_{k\_tgt}$, $dG_{k\_tgt}$, and $dB_{k\_tgt}$) for test colors (S440). Then, the image is displayed on the monitor according to the calculated values and the RGB property of the monitor is measured (S442). After that, the difference between the measured color property and the target color property is calculated (S444). If the difference value exceeds the predetermined threshold, it means that the conversion values for converting the color property into the target color property are incorrect, so that new target x, y and z tristimulus values are set (S449). Then, steps 440 to 446 are performed while applying the new target x, y and z tristimulus values to Equations 1 and 2.

Even if when the difference value is equal to or less than the threshold value at a $k_{th}$ test color, since the above procedure must be performed with respect to all test colors, it is determined whether the panel digital values have been calculated for all test colors (S447). If the panel digital values have been calculated for some test colors, other than all test colors, steps 440 to 446 are performed. However, if the matrix conversion value for all test colors corresponds to the target color property or is different from the target color property within a predetermined threshold, it means that the conversion has been completed, so that the conversion value of the n×n×n lookup table are set as the conversion value of the color conversion module (S448).

Figure 9:
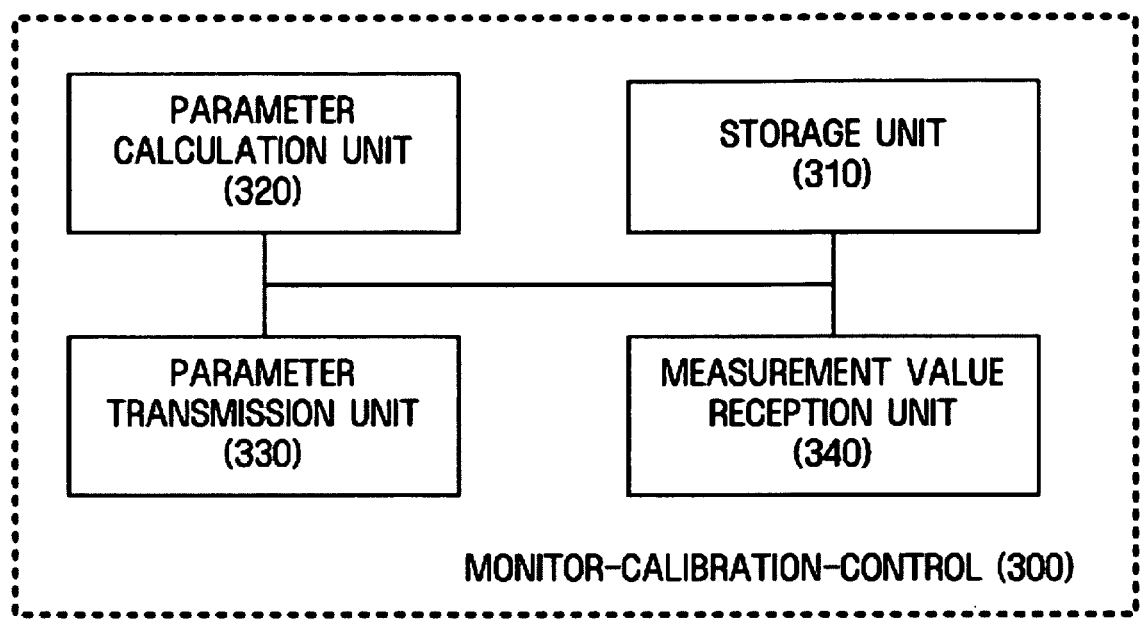
FIG. 9 is a view illustrating the structure of a monitor-calibration-control according to one exemplary embodiment of the present invention.

FIG. 9 is a view illustrating the structure of the monitor-calibration-control 300 according to one exemplary embodiment of the present invention. The monitor-calibration-control 300 can be embodied in the form of software, such as a program, or hardware, such as an IC circuit, installed in a computer or a notebook computer. In addition, it is also possible to provide the monitor-calibration-control in the form of an independent device having a processing function. The monitor-calibration-control 300 includes a storage unit 310, a parameter calculation unit 320, a parameter transmission unit 330 and a measurement value reception unit 340. The storage unit 310 stores a target color property of the monitor. The user can select and store the target color property in the storage unit 310. In addition, the storage unit 310 can receive and store data related to the color property. The values stored in the storage unit 310 can be used as reference values, which are compared with converted values when converting the colors so as to determine whether the conversion procedure must be repeated.

In addition, the parameter calculation unit 320 calculates the conversion parameters used for converting predetermined colors into target colors. The conversion parameters include parameters of the one-dimensional lookup table, the conversion matrix, or the three-dimensional lookup table. The conversion parameters calculated by the parameter calculation unit 320 are transferred to the output device, such as the monitor, through the parameter transmission unit 330. Upon receiving the conversion parameters, the monitor converts the colors by setting the conversion parameter as the conversion values of the color conversion module or the backlight control module and then outputs the colors.

In the above-mentioned flowchart, the measurement value reception unit 340 receives the color property of the monitor, which is output from the color meter, in order to recognize the color property of the monitor, which has been output so as to calculate the parameters. The color property received in the measurement value reception unit 340 is compared with the target color property when calculating the parameters using the storage unit 310 and the parameter calculation unit 320.

As described above, according to the exemplary embodiments of the present invention, it is possible to calibrate the color property of the monitor including the color conversion module and/or the backlight control module by using the color meter in such a manner that the monitor can represent specific white, black, and primary color properties.

In addition, the conversion result is repeatedly used during the conversion procedure for the color property, so that the color property may gradually reach the target color property.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of calibrating a color property of a monitor used in a system including a color conversion module, a color measurement module and a display module, the method comprising:

storing a target color property;

measuring a color property of an image displayed on the display module using the color measurement module; and generating an image control signal so as to control the color property of the image displayed on the display module based on the target color property and the measured color property of the image, wherein the generating the image control signal comprises:

(a) obtaining tristimulus values of color displayed on the display module;

(b) measuring color property of the tristimulus values using the color measurement module;

(c) calculating the difference between the measured color property of the tristimulus values and the target color property;

(d) generating the image control signal in the system when the difference is equal to or less than a predetermined threshold; and (e) updating the tristimulus values and repeating operations (b) through (d) when the difference is more than the predetermined threshold, wherein the updating is performed by multiplying the obtained tristimulus values by a ratio of the target color property and the measured color property of the tristimulus values.

2. The method of claim 1, wherein the target color property comprises a target tristimulus value, and the measured color property comprises a measured tristimulus value.

3. The method of claim 1, wherein the storing comprises storing the target color property of the image output through the system.

4. The method of claim 1, wherein operations (a) through (e) are repeated for a predetermined range of each of R, G and B values.

5. The method of claim 1, wherein the image control signal forms a lookup table for converting color information of input colors through 1:1 conversion.

6. The method of claim 1, wherein the image control signal forms a 3×3 matrix for converting color information of input colors into the target color property.

7. The method of claim 1, wherein the image control signal forms a 3×n matrix for converting color information of input colors into the target color property, in which n is greater than 3, and the image control signal comprises the target color property or a value obtained by combining at least two pieces of color information forming the target color property.

8. The method of claim 1, wherein the image control signal comprises an amount of backlight to be controlled.

9. The method of claim 1, wherein the image control signal forms a three-dimensional lookup table for converting color information of input colors into the target color property.

10. A computer-readable memory having embodied thereon a computer program for executing a method of calibrating a color property of a monitor used in a system including a color conversion module, a color measurement module and a display module, the method comprising:

storing a target color property;

measuring a color property of an image displayed on the display module using the color measurement module; and generating an image control signal so as to control the color property of the image displayed on the display module based on the target color property and the measured color property of the image, wherein the generating the image control signal comprises:

(a) obtaining tristimulus values of color displayed on the display module; (b) measuring color property of the tristimulus values using the color measurement module;

(c) calculating the difference between the measured color property of the tristimulus values and the target color property;

(d) generating the image control signal in the system when the difference is equal to or less than a predetermined threshold; and (e) updating the tristimulus values and repeating operations (b) through (d) when the difference is more than the predetermined threshold, wherein the updating is performed by multiplying the obtained tristimulus values by a ratio of the target color property and the measured color property of the tristimulus values.

11. The computer-readable memory of claim 10, wherein the target color property comprises a target tristimulus value, and the measured color property comprises a measured tristimulus value.

12. The computer-readable memory of claim 10, wherein the storing comprises storing the target color property of the image output through the system.

13. The computer-readable memory of claim 10, wherein operations (a) through (e) are repeated for a predetermined range of each of R, G and B values.

14. The computer-readable memory of claim 10, wherein the image control signal forms a lookup table for converting color information of input colors through 1:1 conversion.

15. The computer-readable memory of claim 10, wherein the image control signal forms a 3×3 matrix for converting color information of input colors into the target color property.

16. The computer-readable memory of claim 10, wherein the image control signal forms a 3×n matrix for converting color information of input colors into the target color property, in which n is greater than 3, and the image control signal comprises the target color property or a value obtained by combining at least two pieces of color information forming the target color property.

17. The computer-readable memory of claim 10, wherein the image control signal comprises an amount of backlight to be controlled.

18. The computer-readable memory of claim 10, wherein the image control signal forms a three-dimensional lookup table for converting color information of input colors into the target color property.

19. A system comprising:

a storage module that stores a target color property;

a display module that displays an image;

a color measurement module that measures a color property of the image displayed on the display module; and a color conversion module that receives a measurement value of the image displayed on the display module from the color measurement module and generates an image control signal so as to control the color property of the image displayed on the display module based on the target color property and the measured color property of the image, wherein the color conversion modules generates the image control signal by (a) obtaining tristimulus values of color displayed on the display module, (b) measuring color property of the tristimulus values using the color measurement module, (c) calculating the difference between the measured color property of the tristimulus values and the target color property, (d) generating the image control signal in the system when the difference is equal to or less than a predetermined threshold, and (e) updating the tristimulus values and repeating (b) through (d) when the difference is more than the predetermined threshold, wherein the updating the tristimulus values is performed by multiplying the obtained tristimulus values by a ratio of the target color property and the measured color property of the tristimulus values.

20. The system of claim 19, wherein the target color property comprises a target tristimulus value, and the measured color property comprises a measured tristimulus value.

21. The system of claim 19, wherein the image control signal forms a lookup table for converting color information of input colors through 1:1 conversion.

22. The system of claim 19, wherein the image control signal forms a 3×3 matrix for converting color information of input colors into the target color property.

23. The system of claim 19, wherein the image control signal forms a 3×n matrix for converting color information of input colors into the target color property, in which n is greater than 3, and the image control signal comprises the target color property or a value obtained by combining at least two pieces of color information forming the target color property.

24. The system of claim 19, wherein the image control signal comprises an amount of backlight to be controlled.

25. The system of claim 19, wherein the image control signal forms a three-dimensional lookup table for converting color information of input colors into the target color property.

* * * * *